United States Patent
Hirade et al.

(10) Patent No.: US 8,153,247 B2
(45) Date of Patent: Apr. 10, 2012

(54) METHOD OF MANUFACTURING ABS RESIN MOLDED PART AND ABS RESIN MOLDED PART

(75) Inventors: Koji Hirade, Yokohama (JP); Hidenori Miyamoto, Urayasu (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/320,693

(22) Filed: Feb. 2, 2009

(65) Prior Publication Data

US 2009/0155538 A1 Jun. 18, 2009

Related U.S. Application Data

(63) Continuation of application No. 11/322,220, filed on Jan. 3, 2006, now abandoned.

(30) Foreign Application Priority Data

Jan. 25, 2005 (JP) ................................ 2005-017324

(51) Int. Cl.
*B32B 27/32* (2006.01)
*B32B 5/16* (2006.01)
*B32B 27/00* (2006.01)

(52) U.S. Cl. ........ 428/327; 428/220; 428/323; 428/332; 428/500

(58) Field of Classification Search .................. None
See application file for complete search history.

(56) References Cited

U.S. PATENT DOCUMENTS 4,227,963 A 10/1980 Wiggins

FOREIGN PATENT DOCUMENTS

| JP | A-5-59587 | 3/1993 |
|---|---|---|
| JP | A-5-230276 | 9/1993 |
| JP | A-9-268371 | 10/1997 |
| JP | 10-183362 A | 7/1998 |
| JP | 2003-147154 A | 5/2003 |
| JP | 2004-001497 A | 1/2004 |
| WO | WO 03/025256 A1 | 3/2003 |

OTHER PUBLICATIONS

Japanese Office Action with English-language translation for Japanese Application No. 2005-017324 mailed Oct. 26, 2010.

*Primary Examiner* — Sheeba Ahmed
(74) *Attorney, Agent, or Firm* — Oliff & Berridge, PLC

(57) ABSTRACT

An ABS resin molded part is manufactured by forming a molded part of an ABS resin into which a particulate filler is mixed, eluting butadiene particles from the surface of the molded part by etching, and forming a plating coat on the surface after the etching.

6 Claims, 2 Drawing Sheets

METHOD OF MANUFACTURING ABS RESIN MOLDED PART AND ABS RESIN MOLDED PART

This is a Continuation of application Ser. No. 11/322,220 filed Jan. 3, 2006, which claims the benefit of Japanese Patent Application No. 2005-017324 filed Jan. 25, 2005. The disclosure of the prior applications is hereby incorporated by reference herein in their entirety.

BACKGROUND OF THE INVENTION

1. Field of the Invention

The present invention relates to a method of manufacturing a plated ABS resin molded part and to an ABS resin molded part.

2. Description of the Related Art

Heretofore, an injection molded part of an ABS resin has been widely used in electronic and electric equipment, and various kinds of plated part manufacturing methods have been proposed (See Japanese Unexamined Patent Application Publication No. Hei 5-59587 and Japanese Unexamined Patent Application Publication No. Hei 5-230276). In particular, with greater demands for miniaturization, cost reduction, and so on to the electronic equipment in recent years, there have been great demands for a reduction in the thickness of plating because an increase in the time taken for the plating process, which is in proportion to the thickness of plating, causes higher cost.

However, when thin film is plated on an injection molded part of an ABS resin having a thick walled part and a thin walled part adjoining with each other, there is a problem of uneven plating, especially in the thin walled part. Accordingly, in order to improve the yield of the part in such a case, the thickness of plating has to be large to a certain extent in actual conditions.

Note that Japanese Unexamined Patent Application Publication No. Hei 5-59587 and Japanese Unexamined Patent Application Publication No. Hei 5-230276 disclose techniques of improving plating adhesiveness and so on, however, they do not describe reducing uneven plating on the material surface of the ABS resin molded part having the thick walled part and the thin walled part adjoining with each other.

SUMMARY OF THE INVENTION

The present invention has been made in view of solving the above-described problems of the related art. The object thereof is to provide a means for greatly reducing uneven plating when applying thin film plating to an injection molded part of an ABS resin.

According to a first aspect of the present invention, a method of manufacturing an ABS resin molded part includes the steps of: forming a molded part of an ABS resin into which a particulate filler is mixed; eluting butadiene particles from a surface of the molded part by etching; and forming a plating coat on the surface after the etching.

In the above-described first aspect, it is preferable that the molded part be formed by injection molding the ABS resin into a mold and include a thick walled part and a thin walled part adjoining with each other. Preferably, a thickness of the plating coat be 10 μm or less, and the filler be carbon black. Preferably, an average particle diameter of the filler be 0.5 μm or less. Preferably, the ABS resin contains the filler at 0.1 wt % or more to 0.5 wt % or less.

According to a second aspect of the present invention, an ABS resin molded part is such that an ABS resin into which a particulate filler is mixed is injection molded, and butadiene particles is eluted from a surface of the injection molded ABS resin by etching, and a plating coat is formed on the surface after the etching.

Further, according to a third aspect of the present invention, an ABS resin molded part includes: an injection molded part made of an ABS resin into which a particulate filler is mixed; etching pits formed on a surface of the injection molded part by etching butadiene particles; and a plating coat formed on the surface of the injection molded part.

Here, it is preferable that the injection molded part in the above-described second aspect or third aspect include a thick walled part and a thin walled part adjoining with each other. In the above-described second aspect and third aspect, preferably, a thickness of the plating coat be 10 μm or less. Preferably, the filler be carbon black. Preferably, an average particle diameter of the filler be 0.5 μm or less. Preferably, the ABS resin contain the filler at 0.1 wt % or more to 0.5 wt % or less.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
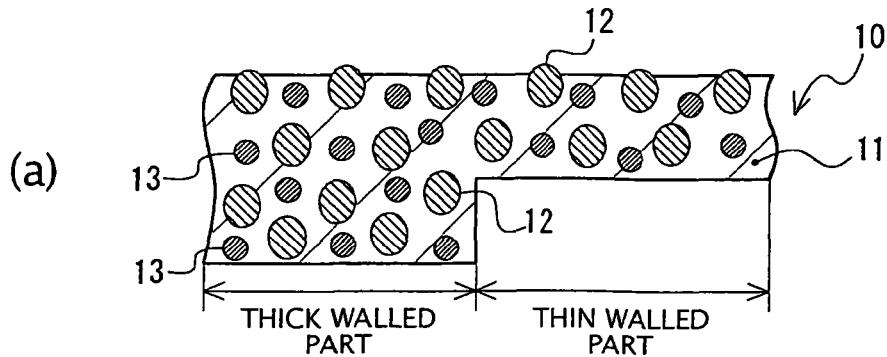
FIG. 1A to FIG. 1C shows butadiene particles and shapes of etching pits in an ABS injection molded part of the present embodiment; and FIG. 2A to FIG. 2C shows butadiene particles and shapes of etching pits in a conventional ABS injection molded part.
Figure 1:
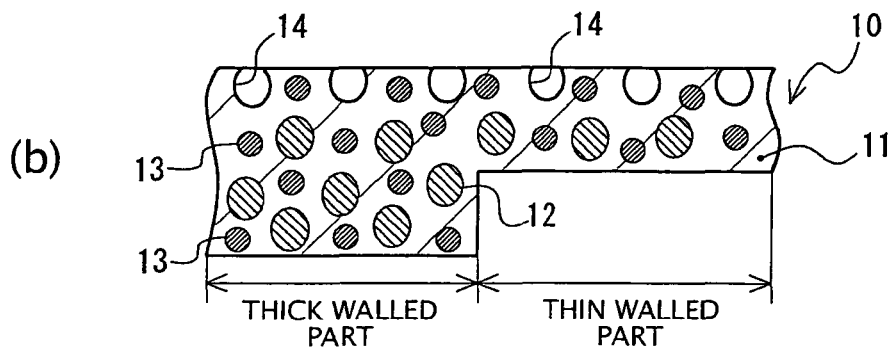
Figure 1:
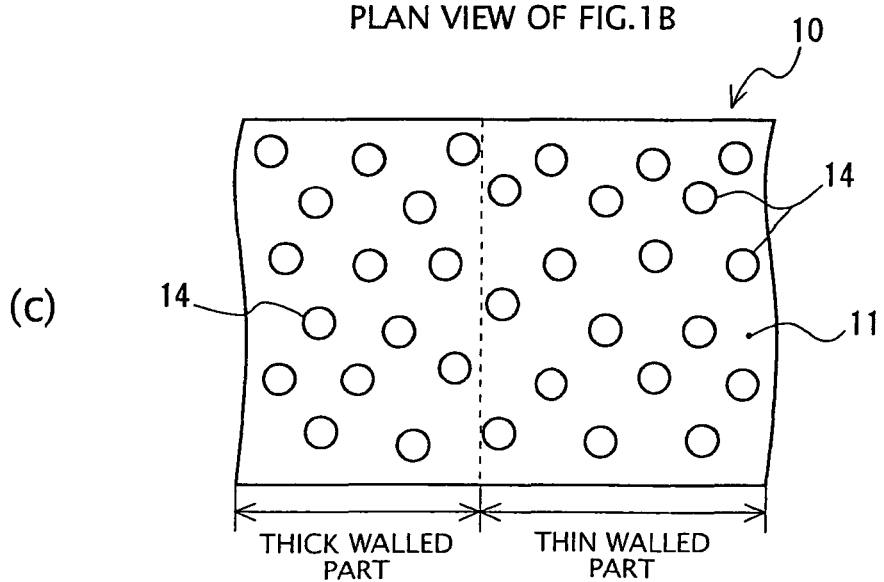

A manufacturing method of an ABS resin molded part having a plating coat according to an embodiment of the present invention will be described below.

Firstly, carbon black is mixed as a particulate filler into an ABS resin and dispersed. Then, the ABS resin into which the carbon black is mixed is injected into a mold by an injection molding machine to form an ABS resin molded part including a step portion where a thick walled part and a thin walled part adjoin with each other.

Secondly, the ABS resin molded part made in the above-described first process is degreased, and thereafter etched. By the etching, butadiene particles are decomposed by oxidation and eluted from the surface of the ABS resin molded part. Thereby, innumerable minute holes (etching pits) are formed on the surface of the material. It is known that the adhesiveness between the material surface and the plating coat is improved through the above-described etching processing since plating metal is embedded into the etching pits in the plating process (anchor effect). In this embodiment, as described later, nearly circular and almost isotropic etching pits are formed substantially evenly on the surface of the ABS resin molded part. The etching pits are less oriented in a direction in which the resin flows. Accordingly, the density of etching pits does not differ much in-between the thin walled part and the thick walled part of the molded part.

Thirdly, the etched ABS resin molded part is catalytically treated through a catalyser-accelerator process or the like. Thereafter, the catalytically treated surface is chemically plated and then electroplated. Thus, the plating coat is formed on the ABS resin molded part.

In this embodiment, the carbon black is mixed into the ABS resin in order to reduce uneven plating which occurs in the thin walled part of the ABS above-described resin molded part when plated. The inventors of the present invention presumes the cause of the uneven plating in the thin walled part based on later-described experimental results and acquires the following findings.

The ABS resin at the time of injection molding flows in the mold with an AS phase 11 of acrylic and styrene turned into a liquid state but butadiene remaining in a particulate state. The butadiene particles 12 in the ABS resin have the property of expanding and contracting by external force. Therefore, the shapes of the butadiene particles 12 in an ABS resin molded part 10 change according to molding conditions, the shape of the mold, and so on. More specifically, when the molded part 10 includes the step portion where the thick walled part and the thin walled part adjoin with each other, the shapes of the butadiene particles 12 in the thick walled part and the thin walled part differ as follows.

The narrower the width of the mold (thin walled part of the molded part) is, the faster the ABS resin flows and the larger the resistance acting on the butadiene particles 12 is. Namely, in the narrow portion of the mold, the ABS resin flows at high speed, and the butadiene particles 12 are extended by the resistance in a direction where the resin flows. Accordingly, in the thin walled part of the molded part 10, the butadiene particles 12 tend to be transformed into a flat shape. On the other hand, the ABS resin flows at relatively low speed in a wide portion of the mold, so that, roughly spherical shape of the butadiene particles 12 is maintained in the thick walled part of the molded part 10 without being transformed so much (See FIG. 2A).

Figure 2:
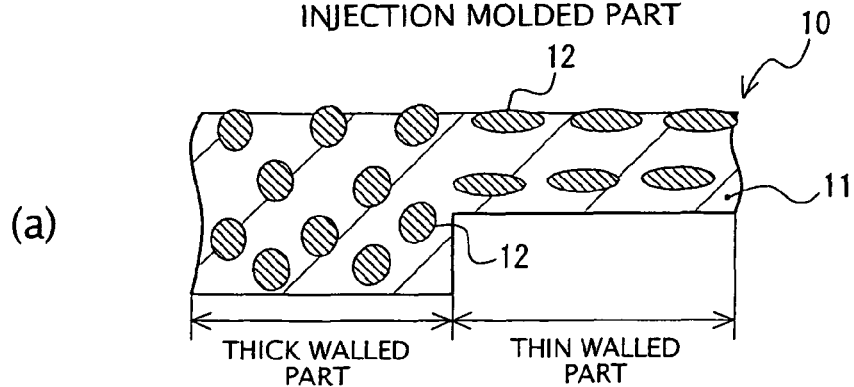
Figure 2:
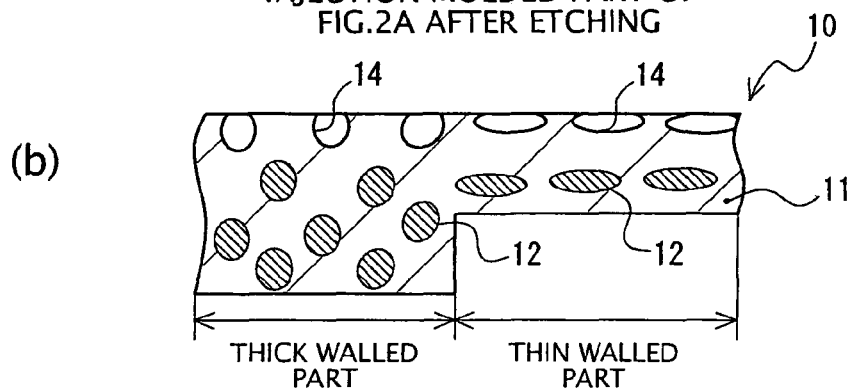
Figure 2:
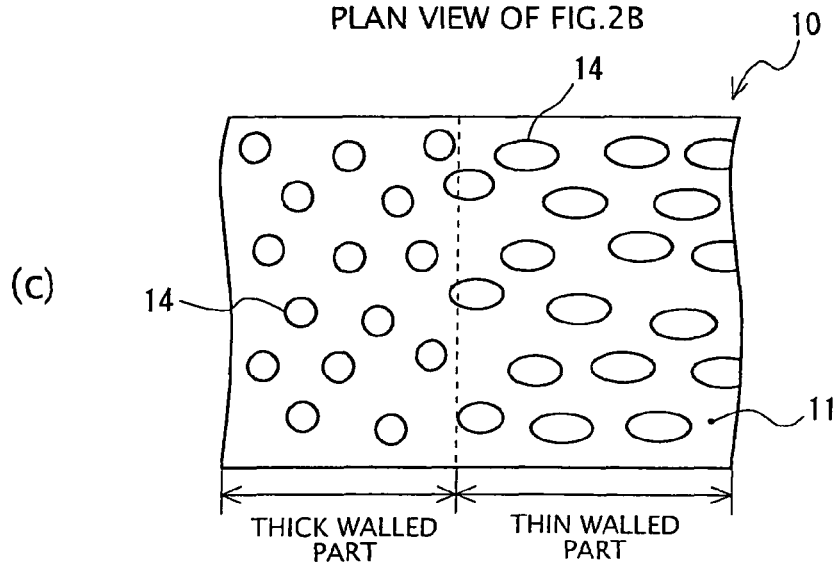

Accordingly, flat, shallow, and large etching pits 14 are formed on the surface of the thin walled part in the etched step portion while nearly circular, almost isotropic, and small etching pits 14 are formed on the surface of the thick walled part (See FIG. 2B and FIG. 2C). This causes a difference in the density of etching pits between the thin walled part and the thick walled part of the molded part. Therefore, it is conceivable that uneven plating is very apt to occur in thin film plating of a film thickness of 10 μm or less because it is particularly susceptible to the influence on the material surface. Note that in the case of the thin film plating of the film thickness of 10 μm or less, it is desirable that the thickness of a plating coat be usually 6 μm or more, but a thickness less than 6 μm is also possible.

FIG. 1A to FIG. 1C shows a state where carbon black 13 is mixed into the ABS resin. In FIG. 1A to FIG. 1C, the carbon black 13 enters between the butadiene particles 12 of the ABS resin. At the injection molding, the butadiene particles 12 flow, holding the carbon black 13, so that the butadiene particles 12 are not greatly transformed even in the narrow portion of the mold (See FIG. 1A). Hence, in this case, the shapes of the butadiene particles 12 which solidify at the material surfaces of the thin walled part and the thick walled part become almost uniform, reducing the difference in the density of the etched etching pits 14 consequently (See FIG. 1B and FIG. 1C). As described above, it is conceivable that in this embodiment, unevenness in thin film plating is not apt to occur.

If the average particle diameter of the carbon black exceeds 0.5 μm, the adhesiveness between the material surface and the plating coat and the appearance of the plating coat deteriorate. Therefore, it is desirable that the average particle diameter of the carbon black mixed into the ABS resin be 0.5 μm or less. Moreover, it is desirable that the average particle diameter of the carbon black be 0.2 μm or more, but a particle diameter less than 0.2 μm is also possible.

Further, it is desirable that the ABS resin contain the carbon black at 0.1 wt % or more to 0.5 wt % or less because of the following reasons. If the carbon black content is less than 0.1 wt %, the butadiene particles are transformed in the thin walled part due to a little carbon black, and uneven plating is conspicuous in thin plating coat. On the other hand, if the carbon black content exceeds 0.5 wt %, it results in overreaching, worsening the state of the surface after plating.

EXAMPLES

Examples of the present invention will be described below. Through the experiment, five kinds of specimens with the same shape are formed by the injection molding machine, using four kinds of ABS resins different in the average particle diameter of the carbon black and carbon black content, and an ABS resin containing no carbon black. Here, UMG CYCOLAC 3001M is used as the ABS resin. The shape of each of the specimens is set to include the step portion where the thick walled part and the thin walled part adjoin with each other.

Then, each of the specimens is subjected to degreasing, etching, catalytic treatment, chemical plating, and electroplating in order, and a plating coat with a thickness of 10 μm is formed on the surface thereof. Thereafter, the state of the surface of the plating coat on each specimen is evaluated visually. Results thereof will be shown in Table 1.

TABLE 1

|  | AVERAGE PATRTICLE DIAMETER OF CARBON BLACK (μm) | CARBON BLACK CONTENT (wt %) | STATE OF SURFACE PLATING COAT |
| --- | --- | --- | --- |
| COMPARATIVE EXAMPLE | — | — | X |
| EXPERIMENT 1 | 0.2 | 0.1~0.2 | ○ |
| EXPERIMENT 2 | 0.5 | 0.1~0.2 | ○ |
| EXPERIMENT 3 | 0.2 | 0.3~0.5 | ◎ |
| EXPERIMENT 4 | 0.5 | 0.3~0.5 | ◎ |

◎: EVEN
○: VERY SLIGHTLY UNEVEN
X: DISTINCTLY UNEVEN

In Experiment 1 (average particle diameter: 0.2 μm, content: 0.1 wt % to 0.2 wt %) and Experiment 2 (average particle diameter: 0.5 μm, content: 0.1 wt % to 0.2 wt %), a substantially good plated surface is obtained on each of the specimens although very slightly uneven plating is found in the thin walled parts thereof. Further, in Experiment 3 (average particle diameter: 0.2 μm, content: 0.3 wt % to 0.5 wt %) and Experiment 4 (average particle diameter: 0.5 μm, content: 0.3 wt % to 0.5 wt %), a very good plated surface is obtained on the specimens without unevenness in plating between the thin walled part and the thick walled part. However, remarkable uneven plating is found on the surface of the specimen without carbon black (comparative example).

Supplementary Description of Embodiment

The above-described embodiment describes the example in which the carbon black is mixed as the particulate filler into the ABS resin. However, any other particulate filler can be used as long as it can maintain its solid state at a temperature when the ABS resin is injection molded and suppress transformation of the butadiene particles at the time of the injection molding.

For example, particles of an organic filler of glass beads, silica, quartz powder, glass powder, silicate (calcium silicate, kaoline, talc, clay, diatomaceous earth, or the like), metal oxide (iron oxide, titanium oxide, zinc oxide, alumina, or the like), metal carbonate (calcium carbonate, magnesium carbonate, or the like), sulfate (calcium sulfate, barium sulfate, or the like), ceramics (silicon carbide, boron nitride, or the like) may be mixed into the ABS resin.

Further, the above-described embodiment describes the example in which the thin film plating is formed on the ABS resin molded part including the step portion where the thick walled part and the thin walled part adjoin with each other. However, the present invention is also applicable to a case where the thin film plating is formed on an ABS resin molded part including a portion whose thickness increases or decreases continuously.

The invention is not limited to the above embodiments and various modifications may be made without departing from the spirit and scope of the invention. Any improvement may be made in part or all of the components.

What is claimed is:

1. An ABS resin molded part, comprising:
   an injection molded part being made of a carbon black particulate filler having an average particle diameter of 0.5 µm or less and an ABS resin comprising butadiene particles, wherein the carbon black particulate filler is included in the ABS resin in an amount of 0.1 to 0.5 weight percent, and the injection molded part having a shape including a step portion,
   wherein on a first side of the step portion, the molded part has a thickness greater than a thickness of the molded part on a second side of the step portion adjoining the first side, the butadiene particles have a substantially same shape on both the first side and the second side of the step portion;
   etching pits formed on a surface of the injection molded part by etching the butadiene particles; and
   a plating coat formed on the surface of the injection molded part.

2. The ABS resin molded part according to claim 1, wherein a thickness of said plating coat is 10 µm or less.

3. An ABS resin molded part,
   wherein the ABS resin molded part is derived from an ABS resin mixture comprising butadiene particles and a carbon black particulate filler, the carbon black particulate filler having an average particle diameter of 0.5 µm or less and present in an amount of 0.1 to 0.5 weight percent of the ABS resin mixture, the ABS resin mixture being injection molded to form an injection molded part including a shape comprising a step portion,
   the step portion comprising a thick walled portion and a thin walled portion that is adjacent to the thick walled portion, the thick walled portion having a thickness greater than the thin walled portion,
   wherein a shape of the butadiene particles in the thick walled portion and a shape of the butadiene particles in the thin walled portion take a substantially uniform shape upon injection molding of the injection molded part including the step portion;
   wherein the butadiene particles at a surface of the injection molded part including the step portion are eluted from the surface by etching; and
   wherein a plating coat with a thickness of 10 µm or less is formed on the surface after the etching.

4. A method of manufacturing an ABS resin molded part, comprising:
   forming a molded part by injection molding into a mold an ABS resin mixture comprising butadiene particles and a carbon black particulate filler, the carbon black particulate filler having an average particle diameter of 0.5 µm or less and present in an amount of 0.1 to 0.5 weight percent of the ABS resin mixture, the molded part including a step portion, the step portion comprising a thick walled portion and a thin walled portion that is adjacent to the thick walled portion, the thick walled portion having a thickness greater than the thin walled portion;
   wherein a shape of the butadiene particles in the thick walled portion and a shape of the butadiene particles in the thin walled portion are a substantially uniform shape;
   eluting the butadiene particles from a surface of the molded part by etching; and
   forming a plating coat on the surface after the etching.

5. The method according to claim 4, wherein a thickness of said plating coat is 10 µm or less.

6. The method according to claim 4, wherein on a first side of the step portion the molded part has a thickness greater than a thickness of the molded part on a second side of the step portion adjoining the first side, wherein the butadiene particles have a substantially same shape on both the first side and the second side of the step portion.

* * * * *